US011623741B2

(12) United States Patent
Berger et al.

(10) Patent No.: US 11,623,741 B2
(45) Date of Patent: Apr. 11, 2023

(54) THRUST MARGIN MONITORING DEVICE FOR ROTORCRAFT, ROTORCRAFT AND CORRESPONDING METHOD

(71) Applicant: AIRBUS HELICOPTERS, Marignane (FR)

(72) Inventors: Laurent Berger, Cyr sur Mer (FR); Guillaume Dumur, Salon de Provence (FR); Damien Piger, Saint Cannat (FR); Olivier Delecroix, Eguilles (FR); Didier Delsalle, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 231 days.

(21) Appl. No.: 17/125,123

(22) Filed: Dec. 17, 2020

(65) Prior Publication Data

US 2021/0261239 A1 Aug. 26, 2021

(30) Foreign Application Priority Data

Feb. 20, 2020 (FR) ....................................... 2001699

(51) Int. Cl.
*B64C 15/14* (2006.01)
*B64C 15/00* (2006.01)

(52) U.S. Cl.
CPC .............. *B64C 15/14* (2013.01); *B64C 15/00* (2013.01)

(58) Field of Classification Search
CPC ......... B64C 15/14; B64C 15/00; B64C 27/57; B64C 27/82; B64D 31/06; B64D 43/00
USPC ........................................................ 701/14
See application file for complete search history.

(56) References Cited

U.S. PATENT DOCUMENTS

| | | | | |
|---|---|---|---|---|
| 6,371,408 B1* | 4/2002 | Halwes | ............... | B64C 27/82 |
| | | | | 244/17.19 |
| 9,725,164 B2* | 8/2017 | Kelaidis | ............... | G05D 1/0858 |
| 2006/0287778 A1* | 12/2006 | Oltheten | ............... | G01D 7/002 |
| | | | | 701/1 |
| 2010/0312421 A1* | 12/2010 | Eglin | ............... | B64C 27/04 |
| | | | | 701/14 |
| 2011/0071708 A1 | 3/2011 | Chaniot et al. | | |
| 2012/0253560 A1 | 10/2012 | Corpron et al. | | |
| 2013/0264412 A1* | 10/2013 | Dyrla | ............... | B64C 27/82 |
| | | | | 244/17.13 |
| 2015/0122940 A1* | 5/2015 | Mairou | ............... | B64D 11/06 |
| | | | | 244/17.11 |

(Continued)

FOREIGN PATENT DOCUMENTS

| | | |
|---|---|---|
| EP | 1841649 A2 | 10/2007 |
| EP | 2258615 A1 | 12/2010 |

(Continued)

OTHER PUBLICATIONS

French Search Report for French Application No. FR2001699, Completed by the French Patent Office, dated Oct. 22, 2020, 9 pages.

*Primary Examiner* — Shardul D Patel
(74) *Attorney, Agent, or Firm* — Brooks Kushman P.C.

(57) ABSTRACT

A device for monitoring an available thrust margin of an anti-torque member of a rotorcraft as a function of flight conditions, said rotorcraft comprising a power plant driving at least one main rotor participating at least in the lift of said rotorcraft, said anti-torque member participating in the control of the yaw movements of said rotorcraft.

16 Claims, 2 Drawing Sheets

(56) References Cited

U.S. PATENT DOCUMENTS

| | | | |
|---|---|---|---|
| 2019/0084690 A1* | 3/2019 | Bothwell | B64C 13/10 |
| 2020/0023993 A1* | 1/2020 | Germanetti | B64D 45/00 |
| 2020/0031490 A1* | 1/2020 | Bothwell | B64D 45/0005 |
| 2020/0109816 A1* | 4/2020 | Emrich | F16N 31/006 |
| 2020/0298970 A1* | 9/2020 | Acee | B64C 27/06 |

FOREIGN PATENT DOCUMENTS

| | | |
|---|---|---|
| EP | 2631174 A1 | 8/2013 |
| EP | 3456627 A1 | 3/2019 |
| FR | 2950324 A1 | 3/2011 |
| FR | 2973340 A1 | 10/2012 |
| FR | 3084057 A1 | 1/2020 |
| WO | 2006081334 A2 | 8/2006 |
| WO | 2006081334 A3 | 9/2006 |

\* cited by examiner

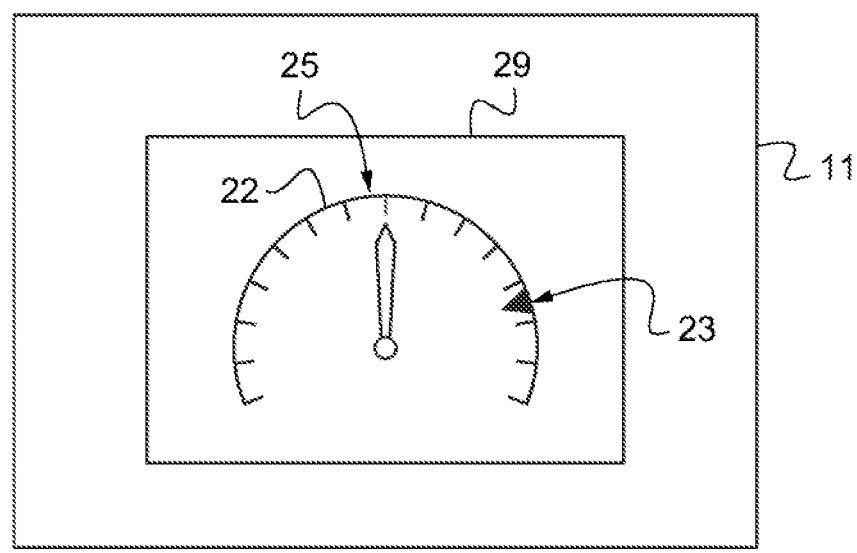
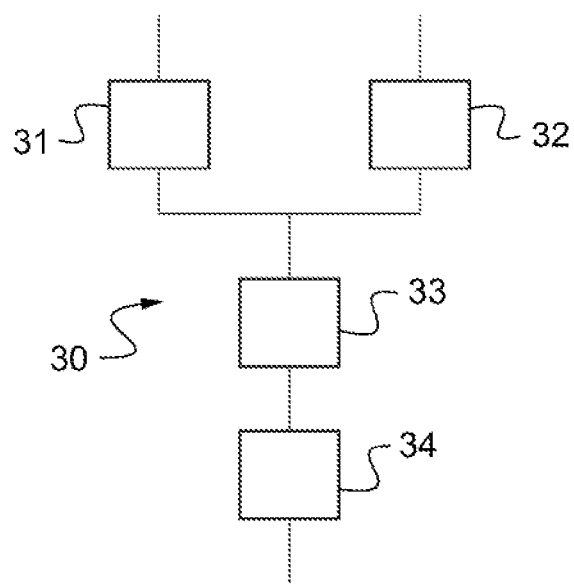
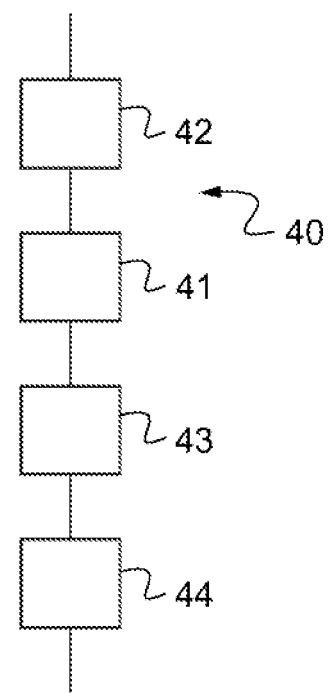

THRUST MARGIN MONITORING DEVICE FOR ROTORCRAFT, ROTORCRAFT AND CORRESPONDING METHOD

CROSS REFERENCE TO RELATED APPLICATION

This application claims foreign priority benefits under 35 U.S.C. § 119(a)-(d) to FR Application 2001699 filed Feb. 20, 2020, which is hereby incorporated by reference in its entirety.

BACKGROUND OF THE INVENTION

(1) Field of the Invention

The present invention relates to a device for determining an available power margin for a rotorcraft and in particular for a helicopter.

(2) Description of Related Art

Generally, in order to pilot a rotorcraft, the pilot or pilots must constantly monitor numerous instruments arranged on a dashboard. These on-board instruments make it possible in particular to signal to the pilot the conditions outside the rotorcraft and the values of certain operating parameters of the rotorcraft. Such operating parameters may in particular relate to a power plant comprising an engine assembly and/or a main power transmission gearbox.

Such a power plant of a rotorcraft also makes it possible to drive the rotation of at least one main rotor participating at least in the lift, or even the propulsion, in the air of the rotorcraft and optionally at least one tail rotor. In actual practice, such a tail rotor is also designated by the term "anti-torque" rotor, since it makes it possible to exert a torque capable of opposing the yaw rotational movement produced by the main rotor. Hereinafter, the expression "anti-torque member" can describe such a tail rotor driven in rotation by the power plant or by a dedicated electric motor.

In addition, other types of anti-torque components can also equip a rotorcraft. Such anti-torque members can in particular be chosen from the group comprising pusher or tractor propellers and movable flaps making it possible to laterally orient a flow of gas at the outlet of a tail boom.

Furthermore, for physical reasons, there are many limitations of this power plant, which the pilot must take into account at every moment of the flight. These limitations are transmitted to the pilot by means of power situation indicators.

Such power situation indicators have in particular been described in documents EP 3,456,627, EP 2,631,174, U.S. Pat. No. 6,371,408, FR 3,084,057, EP 2,258,615, EP 1,841,649, FR 2,950,324 and FR 2,973,340. These known indicators thus make it possible to provide power information in a rotorcraft. These power situation indicators are generally designated by "FLI" type indicators, FLI being the acronym of the expression "First Limit Indicator" or "IPL" for the French language acronym "Instrument de Premiere Limitation." With such FLI type indicators, a plurality of operating parameters can be used, such as in particular a rotor torque or an engine torque or a torque calculated on the basis of the rotor torque and the engine torque, the temperature of the gases in the engine and the rotational speed of a gas generator fitted to the engine.

However, the various indicators do not make it possible to indicate information to a rotorcraft pilot representative of an available power margin at an anti-torque member.

However, for certain rotorcraft, such a power margin available at an anti-torque member can be advantageous for piloting the rotorcraft during a phase of flight at high altitude. A reduction in the power margin available at the anti-torque member can be caused in particular by the use of an engine generating significant power in order to allow the main rotor to keep the rotorcraft at its current altitude, and more particularly during phases of flight at high altitudes where the surrounding air has a low density.

More precisely, it has therefore been observed that the power margin available at the anti-torque member decreases with the altitude at which the rotorcraft performs its mission. When this available power margin becomes too low, the result may be a degradation in the control or maneuverability performance of the rotorcraft, which may occur, for example, during a phase of hovering at high altitude.

BRIEF SUMMARY OF THE INVENTION

The object of the present invention is therefore to propose the use of a device for monitoring an available thrust margin of an anti-torque member of a rotorcraft as a function of flight conditions. In this way, the pilot can understand and keep a certain margin at the control member making it possible, for example, to simultaneously modify a so-called collective pitch of the blades of the tail rotor or to modify the thrust of at least one pusher propeller. Such a control member may comprise a rudder and is actuated by the pilot by exerting a thrust force by means of his left foot and his right foot on two pedals of the rudder.

The invention therefore relates to a device for monitoring an available thrust margin of an anti-torque member of a rotorcraft as a function of flight conditions, the rotorcraft comprising a power plant driving at least one main rotor participating at least in the lift of the rotorcraft in the air, the anti-torque member participating in the control of the yaw movements of the rotorcraft.

This device is remarkable in that it comprises:
  a logic controller configured to calculate a current value of an operating parameter representative of the thrust margin of the anti-torque member, the operating parameter being a function of a ratio between an available power of the power plant and at least one physico-chemical parameter representative of a density of the surrounding outside air,
  comparison means configured to compare the current value of the operating parameter with a predetermined threshold value of the operating parameter and to determine the available thrust margin of the anti-torque member.

In other words, such a monitoring device allows a pilot to compare the current value of the operating parameter determined by the comparison means with a predetermined threshold value or limit value.

Furthermore, the thrust generated by the anti-torque member makes it possible to stabilize the position of the rotorcraft around a yaw axis. Such an anti-torque member can advantageously be formed by one or more tail rotors, two pusher or tractor propellers or the movable flaps making it possible to laterally orient a flow of gas at the outlet of a tail boom.

Thus, the monitoring device according to the invention allows the pilot of the rotorcraft to keep a minimal available thrust margin at the anti-torque member in order to control the movements of the rotorcraft and possibly to keep the rotorcraft in position during a hovering phase.

The logic controller and the comparison means can advantageously be carried on board the rotorcraft. An alternative may also consist in moving the logic controller and the comparison means to the ground, for example when the rotorcraft is controlled remotely by a pilot from an off-board cockpit.

Furthermore, such a predetermined threshold value of the operating parameter may be constant or variable. Indeed, according to the type of rotorcraft, and more precisely according to the type of control of a rotorcraft main rotor, the predetermined threshold value of the operating parameter may vary over time.

For example, when the rotational speed NR of the main rotor is variable around a nominal value, the predetermined threshold value of the operating parameter can also vary as a function of a current value of the rotational speed NR. As a result, the available thrust margin of the anti-torque member is then also variable as a function of the current value of the rotational speed NR.

In practice, the logic controller of the monitoring device can be connected by wired or wireless means to sensors and/or to at least one other logic controller making it possible to measure or calculate an available power of the power plant.

For example, the available power of the power plant can be determined from a regulation system called "FADEC system," acronym of the expression "Full Authority Digital Engine Control." This FADEC system makes it possible to calculate the power available from the power plant via parameters of engine torque TQ and of rotational speed N2 of a free turbine, for example in the presence of a turboshaft engine.

In addition, the computer of the monitoring device can also be connected by wired or wireless means to sensors and/or to at least one other logic controller making it possible to measure the physicochemical parameter(s) representative of the density of the outside air near the rotorcraft and/or to calculate this air density.

According to one embodiment, the air density can be calculated by a so-called "avionics" controller of the rotorcraft and is transmitted to the logic controller of the monitoring device. In general, air pressure and/or air temperature and/or hygrometry sensors making it possible to measure the physicochemical parameter(s) representative of the air density can then be connected to the avionics controller. Furthermore, the operating parameter may preferably be proportional, or even equal, to the ratio between the available power of the power plant and the density of the surrounding outside air.

Furthermore, such a logic controller of the monitoring device may for example comprise at least one computer, one processor, at least one integrated circuit, at least one programmable system, at least one logic circuit, these examples not limiting the scope given to the expression "logic controller." The terms "computer" or "processor" can denote a central processing unit known by the acronym CPU, a graphics processing unit GPU, a digital unit known by the acronym DSP, a microcontroller, etc.

Advantageously, the device may comprise at least one on-board instrument making it possible to inform a pilot of the rotorcraft by generating piloting information representative of at least the available thrust margin of the anti-torque member.

For example, the pilot of the rotorcraft can view the current value of the operating parameter and the predetermined threshold value on the onboard instrument(s) of the monitoring device. The pilot can thus view an evolution of the available thrust margin by looking at the on-board instrument(s) making it possible, for example, to provide a visual representation of the current value of the operating parameter and of the predetermined threshold value so that the pilot can assess the yaw control maneuverability margin.

In addition, different types of on-board instruments can provide this information representative of the available thrust margin of the anti-torque member.

According to a first embodiment of the invention, the on-board instrument(s) can be configured to generate the piloting information representative only of the available thrust margin of the anti-torque member.

In this case, the on-board instrument(s) are therefore dedicated to providing the piloting information representative only of the available thrust margin of the anti-torque member. The rotorcraft pilot can therefore instantly know the available thrust margin of the anti-torque member by looking at this or these dedicated on-board instrument(s).

According to a second embodiment of the invention, the onboard instrument(s) can be configured to generate the piloting information representative on the one hand of the available thrust margin of the anti-torque member and on the other hand of at least one other margin chosen from the group comprising a gas temperature margin at an inlet of a free low-pressure turbine of an engine of the power plant, a rotational speed margin of a gas generator of the engine of the power plant and a margin of a torque exerted on an output shaft of the engine of the power plant.

In this other case, the on-board instrument(s) of the monitoring device according to the invention can provide piloting information representative of one of the four preceding margins.

Such an arrangement thus makes it possible in particular to inform a rotorcraft pilot on the same on-board instrument. A control screen makes it possible for example to simultaneously or alternately display piloting information representative of the various margins, such as the available thrust margin of the anti-torque member, the temperature margin of the gases at an inlet of a free low-pressure turbine of an engine of the power plant, the rotational speed margin of a gas generator of the engine of the power plant and the margin of a torque exerted on an output shaft of the engine of the power plant.

Advantageously, the piloting information can be first limit information representative of a minimum value chosen from the available thrust margin of the anti-torque member, a temperature margin of the gases at the inlet of the low-pressure free turbine, a margin for the rotational speed of the gas generator and a margin for the torque exerted on the output shaft.

In this case, the pilot's workload then remains the same, since the pilot can view, on one and the same on-board instrument, a margin considered to be the most critical among the available thrust margin of the anti-torque member, the temperature margin of the gases at the inlet of a low-pressure free turbine of an engine of the power plant, the rotational speed margin of a gas generator of the engine of the power plant and the torque margin exerted on the output shaft of the engine of the power plant.

In addition, monitoring the available thrust margin of the anti-torque member allows this first limit information to coherently link the rudder margin representative of a maneuverability margin and the available power margin representative of an engine limit and thus avoids a potential awkward situation caused by a lack of margin of the rudder.

In addition, the mass of the rotorcraft can be reduced by avoiding a multiplication of on-board instruments dedicated to several separate monitoring devices.

According to another aspect, a memory can store at least three predetermined threshold values distinct from the operating parameter, the at least three predetermined threshold values respectively being related to at least three speeds of the power plant, the at least three speeds comprising a take-off speed of said rotorcraft, a maximum continuous speed and a transient speed.

In this way, the monitoring device makes it possible to adapt the predetermined threshold value as a function of a flight phase.

The invention also relates to a rotorcraft comprising a power plant rotating at least one main rotor participating at least in the lift of the rotorcraft, the rotorcraft also comprising an anti-torque member participating in the control of the yaw movements of the rotorcraft.

Such a rotorcraft is remarkable in that it comprises a monitoring device as described above for monitoring an available thrust margin of the anti-torque member as a function of flight conditions.

In other words, the rotorcraft according to the invention then comprises a logic controller to calculate a current value of an operating parameter representative of the thrust margin of the anti-torque member, this operating parameter being a function of a ratio between an available power of the power plant of the rotorcraft and at least one physicochemical parameter representative of a density of the surrounding outside air.

The rotorcraft also comprises comparison means to compare the current value of the operating parameter with a predetermined threshold value of the operating parameter, these comparison means making it possible to determine the available thrust margin of the anti-torque member.

The present invention also relates to a method for monitoring an available thrust margin of an anti-torque member of a rotorcraft as a function of flight conditions, the rotorcraft comprising a power plant driving at least one main rotor participating at least in the lift of the rotorcraft, the anti-torque member in turn participating in the control of the yaw movements of the rotorcraft.

According to the invention, such a monitoring method is remarkable in that it comprises the following steps:

calculating to calculate a current value of an operating parameter representative of the thrust margin of the anti-torque member, the operating parameter being a function of a ratio between an available power of the power plant and at least one physicochemical parameter representative of a density of the surrounding outside air, comparison to compare the current value of the operating parameter with a predetermined threshold value of the operating parameter, the comparison step making it possible to determine the available thrust margin of the anti-torque member.

In other words, the monitoring method makes it possible to calculate the operating parameter at any time as a function of a ratio between the available power of the power plant and the physicochemical parameter(s) representative of the density of the surrounding outside air. Such a calculation step of the method can therefore be carried out at regular time intervals automatically by the monitoring method in accordance with the invention.

The comparison step for comparing the current value of the operating parameter with the predetermined threshold value of the operating parameter is carried out in real time and therefore at regular time intervals during a mission of the rotorcraft so as to guarantee optimal monitoring of the thrust margin available at the anti-torque member.

Advantageously, the monitoring method may include an information step making it possible to inform a pilot of the rotorcraft comprising generating piloting information representative of at least the available thrust margin of the anti-torque member.

Such an information step thus allows the pilot of the rotorcraft to be able to view the current available thrust margin of the anti-torque member at any time. The pilot can thus view any change in the thrust margin and carry out corrective piloting actions allowing him to act on the current value of the operating parameter so that this current value does not exceed the predetermined threshold value.

According to a first variant of the monitoring method, during the information step, the piloting information can be representative only of the available thrust margin of the anti-torque member.

Like before, such an information step carried out by means of the on-board instrument(s) thus makes it possible to generate the piloting information representative only of the available thrust margin of the anti-torque member. The pilot therefore instantly views the available thrust margin of the anti-torque member by looking at this or these dedicated on-board instrument(s).

According to a second variant of the monitoring method, during the information step, the piloting information can be representative on the one hand of the available thrust margin of the anti-torque member and on the other hand of at least one another margin chosen from the group comprising a temperature margin of the gases at an inlet of a free low-pressure turbine of an engine of the power plant, a rotational speed margin of a gas generator of the engine of the power plant and a margin of a torque exerted on an output shaft of the engine of the power plant.

In this second variant, the display of different margins can thus be achieved on the same on-board instrument. A common control screen thus makes it possible for example to simultaneously or alternatively generate piloting information representative of the various aforementioned margins.

In addition, the mass of the rotorcraft can be reduced by avoiding a multiplication of on-board instruments dedicated to several monitoring methods.

According to another aspect, the piloting information can be first limit information representative of a minimum value chosen from the available thrust margin of the anti-torque member, a temperature margin of the gases at the inlet of the low-pressure free turbine, a margin for the rotational speed of the gas generator and a margin for the torque exerted on the output shaft.

In other words, when the available thrust margin of the anti-torque member is not critical compared to at least one other margin, the first limit information generated in the information step can, at least temporarily, be representative of the temperature margin of the gases at the inlet of the low-pressure free turbine, the rotational speed margin of the gas generator or the margin of the torque exerted on the output shaft.

In addition, the method can also comprise a storage step making it possible to store at least one predetermined threshold value of the operating parameter in a memory. This storage step can be carried out prior to a rotorcraft mission. In this case, a pilot or a co-pilot of the rotorcraft can manually carry out such a storage step.

According to one alternative, such a storage step can also be carried out during a maintenance operation or even at the rotorcraft manufacturing plant, and therefore prior to receipt of the rotorcraft. According to this alternative, the storage step may therefore not be implemented by a pilot or a co-pilot of the rotorcraft.

In practice, such a storage step can make it possible to store at least three predetermined threshold values distinct from the operating parameter, the at least three predetermined threshold values respectively being related to at least three speeds of the power plant, the at least three speeds comprising a take-off speed of the rotorcraft, a maximum continuous speed and a transient speed.

In this way, such a storage step makes it possible to adapt the comparison of the current value of the available thrust margin of the anti-torque member as a function of at least three speeds of the power plant such as the take-off speed of the rotorcraft, the maximum continuous speed and the transient speed for example.

In this case, the comparison step makes it possible to compare the current value of the operating parameter with one of the at least three predetermined threshold values of the operating parameter stored in the memory during the storage step.

BRIEF DESCRIPTION OF THE DRAWINGS

The invention and its advantages will emerge in more detail in the context of the description which follows with examples given by way of illustration with reference to the appended figures, which show.

Elements which are present in several distinct figures are assigned a single reference.

As already mentioned, the invention therefore relates to the technical field of rotorcraft and to monitoring devices intended to facilitate the piloting of this type of aircraft.

DETAILED DESCRIPTION OF THE INVENTION

Figure 1:
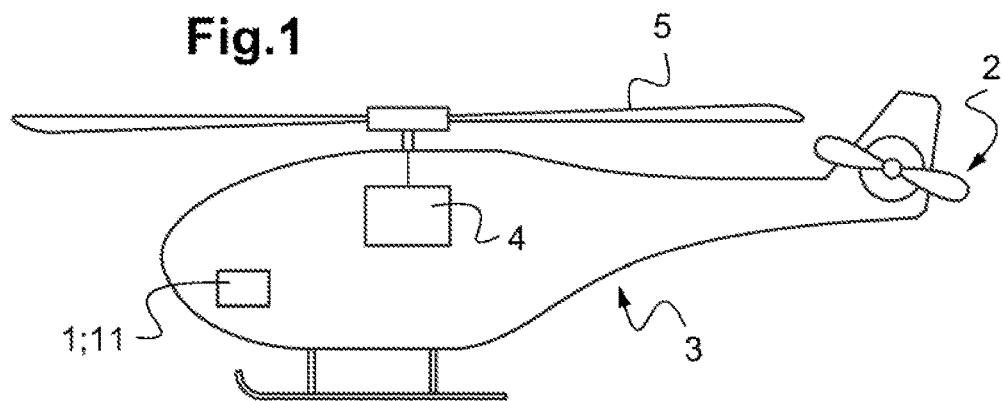
FIG. 1, a side view of a rotorcraft according to the invention.

As shown in FIG. 1, a rotorcraft 3 comprises a power plant 4 and at least one main rotor 5 rotated by this power plant 4. The power plant 4 can in particular comprise at least one heat or electric engine and at least one main power transmission gearbox.

The main rotor 5 thus participates at least in the lift of the rotorcraft 3 in the air. An anti-torque member 2, formed for example by a tail rotor, is arranged at a tail boom. This anti-torque member 2 participates in controlling the yaw movements of the rotorcraft 3. The anti-torque member 2 also makes it possible to control the torque generated by the rotation of the main rotor 5 and transmitted to the fuselage of the rotorcraft 3.

According to another variant, the anti-torque member 2 can also be formed by pusher or tractor propellers arranged on a wing extending transversely with respect to an anteroposterior vertical median plane of the rotorcraft 3. At least one left pusher or tractor propeller can then be arranged at a left side with respect to the anteroposterior vertical midplane and/or at least one right pusher or tractor propeller can be arranged at a right side with respect to the anteroposterior vertical median plane.

According to yet another variant, the anti-torque member 2 may also comprise at least one movable flap making it possible to laterally orient a flow of gas at the outlet of a tail boom. Such an anti-torque member 2 is generally designated by the abbreviation "NOTAR" referring to the expression "NO TAil Rotor" and meaning that the rotorcraft does not have a tail rotor arranged at a tail boom.

Such a rotorcraft 3 also comprises a device 1, 11 for monitoring an available thrust margin of the anti-torque member 2 of the rotorcraft 3 as a function of the flight conditions. Such a device 1, 11 is thus configured to monitor the thrust margin available at the anti-torque member 2 at any time.

Such an available thrust margin is therefore calculated at any time by comparing a current value of an operating parameter with a predetermined threshold value of this operating parameter.

Figure 2:
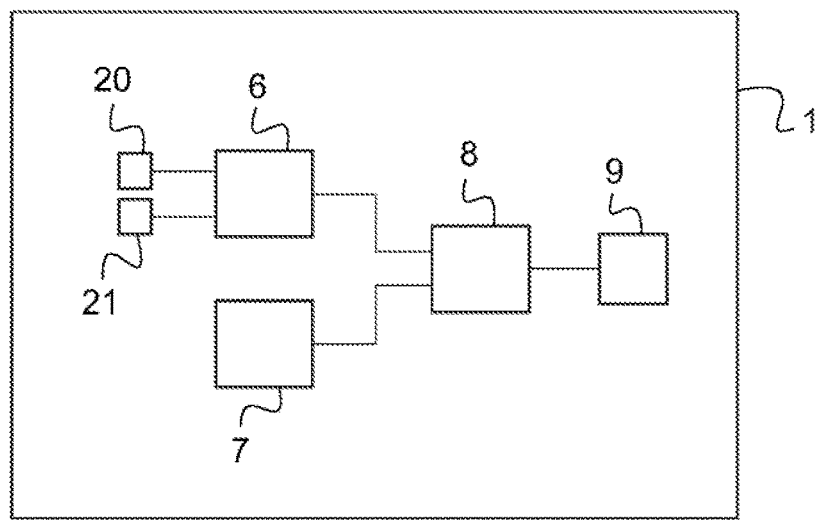
FIG. 2, a block diagram of a monitoring device according to a first embodiment of the invention, FIG. 3, a block diagram of a monitoring device according to a second embodiment of the invention, FIG. 4, a particular example of an on-board instrument of a monitoring device according to the invention, and FIG. 5, a first flowchart illustrating a first advantageous embodiment of a monitoring method according to the invention, and FIG. 6, a second flowchart illustrating a second advantageous embodiment of a monitoring method according to the invention.
Figure 3:
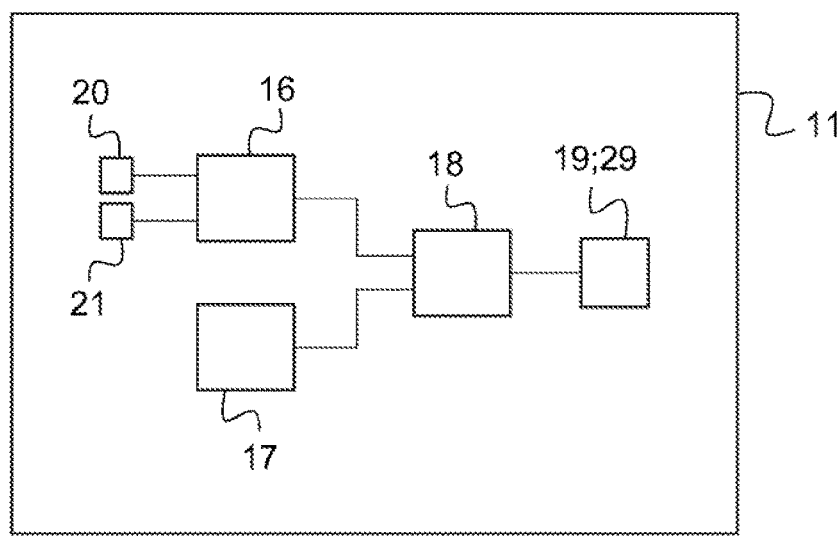

Thus, according to two embodiments of the invention shown in FIGS. 2 and 3, such a monitoring device 1, 11 comprises a logic controller 6, 16 for calculating the current value of the operating parameter representative of the thrust margin of the anti-torque member 2. In addition, such an operating parameter is a function of a ratio between an available power of the power plant 4 and at least one physicochemical parameter representative of a density of the surrounding outside air. Preferably, the operating parameter may be proportional, or even equal, to the ratio between the power available from the power plant 4 and the density of the air.

In practice, the power available from the power plant 4 can be determined by means of a FADEC system of the rotorcraft 3, via sensors for example measuring parameters of engine torque TQ and of rotational speed N2 of a free turbine fitted to a turboshaft engine from the power plant 4.

Furthermore, the computer 6, 16 of the monitoring device 1, 11 can also be connected by wired or wireless means to one or more sensors 20 and/or to at least one other logic controller 21 making it possible to measure the physicochemical parameter(s) representative of the air density or to calculate the density of the outside air near the rotorcraft 3.

According to one embodiment, the density of the air can be calculated by an avionics controller fitted to the rotorcraft 3 on the basis in particular of data collected by sensors measuring the pressure, temperature and/or hygrometry of the surrounding air. The air density is then calculated and can then be transmitted to the logic controller 6, 16 of the monitoring device 1, 11.

Furthermore, such a logic controller 6, 16 of the monitoring device 1, 11 may for example comprise at least one computer, one processor, at least one integrated circuit, at least one programmable system, at least one logic circuit, these examples not limiting the scope given to the expression "logic controller." The terms "computer" or "processor" can denote a central processing unit known by the acronym CPU, a graphics processing unit GPU, a digital unit known by the acronym DSP, a microcontroller, etc.

Such an operating parameter representative of the thrust margin of the anti-torque member 2 can for example be designated by a reduced available power.

In addition, the monitoring device 1, 11 may also comprise a memory 7, 17 or the like for storing at least one predetermined threshold value of the operating parameter. Such a memory 7, 17 is advantageously on board the rotorcraft 3 and can be a memory of the type accessible in read mode and, under certain conditions, modifiable in write mode by a pilot of the rotorcraft or else be of the write-protected type and not modifiable by a rotorcraft pilot 3.

Such a predetermined threshold value of the operating parameter is for example determined by calculations, simulations and/or flight tests prior to the mission of the rotorcraft 3, or even the marketing of the rotorcraft 3. For example, the predetermined threshold value of the operating parameter can be a reduced available power of between 500 kW and 1000 kW, and preferably between 600 kW and 800 kW. In addition, such a predetermined threshold value of the operating parameter is specific to each type of rotorcraft and can also be adapted as a function of a particular type of mission.

In addition, the monitoring device 1, 11 comprises comparison means 8, 18 connected by wired or wireless means both to the logic controller 6, 16 and to the memory 7, 17. Such comparison means 8, 18 are then configured to compare the current value of the operating parameter with the predetermined threshold value of the operating parameter. The comparison means 8, 18 then make it possible to determine the available thrust margin of the anti-torque member 2.

In addition, the device 1, 11 can advantageously comprise at least one on-board instrument 9, 19, 29 making it possible to generate at least one piloting information item representative of this available thrust margin of the anti-torque member 2.

Such an on-board instrument 9, 19, 29 may for example comprise a screen, a dial, a gauge, one or more indicator lights, diodes or any on-board instrument in general.

According to a first embodiment of the invention shown in FIG. 2, the on-board instrument 9 can be configured to generate piloting information representative exclusively of the available thrust margin of the anti-torque member 2. Thus, the pilot of the rotorcraft 3 can at any time know the available thrust margin of the anti-torque member 2 by looking at the piloting information constantly displayed on the on-board instrument 9.

According to a second embodiment of the invention shown in FIGS. 3 and 4, the on-board instrument 19, 29 can for in turn be configured to generate piloting information representative on the one hand of the available thrust margin of the anti-torque member 2 and on the other hand of at least one other margin.

Furthermore, another such margin can for example be chosen from the group comprising a temperature margin of the gases at an inlet of a free low-pressure turbine of an engine of the power plant 4, a rotational speed margin of a gas generator of the engine of the power plant 4 and a margin of a torque exerted on an output shaft of the engine of the power plant 4.

Thus, the on-board instrument 19 can for example simultaneously generate piloting information representative of several margins which are distinct from one another.

The on-board instrument 29 can for its part generate piloting information representative of a minimum margin among the different margins, and therefore which is considered to be the most critical for the piloting of the rotorcraft 3.

In this case, the on-board instrument 29 can generate piloting information assuming the form of first limit information representative of a minimum value chosen from the available thrust margin of the anti-torque member 2, a temperature margin of the gases at the inlet of the low-pressure free turbine, a margin for the rotational speed of the gas generator and a margin for the torque exerted on the output shaft.

A monitoring device 11 comprising such an on-board instrument 29 thus makes it possible to identify, among the parameters for monitoring the available thrust of the anti-torque member 2 and of the turboshaft engine, the one which is closest to its limit. The information relating to the limitations to be observed is thus grouped together on a single reference point 22, making it possible, on the one hand, to carry out a summary and only present the result of this summary in order to simplify the pilot's task and, on the other hand, to save space on the dashboard. A "limiting parameter" is thus obtained, among the parameters for monitoring the available thrust of the anti-torque member 2 and of the turboshaft engine, the current value 25 of which is maximal or the closest to the predetermined threshold value 23 for this parameter. For this reason, such a monitoring device 11 is designated by the expression "first limit indicator," abbreviated "FLI." This first limit indicator therefore makes it possible to know the current value 25 at a given instant of the limiting parameter. The pilot's workload is considerably reduced, since he is now satisfied with using a single on-board instrument 29 to monitor several distinct parameters.

Advantageously, the memory 17 can for its part store at least three predetermined threshold values distinct from the operating parameter. In this case, these at least three predetermined threshold values respectively relate to at least three speeds of the power plant 4, the at least three speeds comprising a take-off speed of the rotorcraft 3, a maximum continuous speed and a transient speed.

By way of non-limiting example, a first predetermined threshold value corresponding to the take-off speed of the rotorcraft 3 may be a reduced available power of between 600 kW and 700 kW, a second predetermined threshold value corresponding to the maximum continuous speed of the rotorcraft 3 may be a reduced available power comprised between 650 kW and 750 kW and a third predetermined threshold value corresponding to a transient regime of the rotorcraft 3 may be a reduced available power comprised between 700 kW and 800 kW.

As shown in FIGS. 5 and 6, the invention also relates to a method 30, 40 for monitoring an available thrust margin of the anti-torque member 2 of the rotorcraft 3 as a function of flight conditions.

Thus, the method 30, 40 comprises a calculation step 31, 41 for calculating a current value of an operating parameter representative of this thrust margin of the anti-torque member 2. As already indicated, this operating parameter is a function of a ratio between an available power of the power plant 4 and at least one physicochemical parameter representative of a density of the surrounding outside air.

In addition, the method 30, 40 can also comprise a storage step 32, 42 so as to record at least one predetermined threshold value of the operating parameter in the memory 7, 17.

Furthermore, the method 30, 40 also comprises a comparison step 33, 43 for comparing the current value of the operating parameter with the predetermined threshold value of the operating parameter, this comparison step 33, 43 making it possible to determine the available thrust margin of the anti-torque member 2 by calculation.

Finally, such a monitoring method 30, 40 may comprise an information step 34, 44 for generating, on at least one on-board instrument 9, 19, 29, at least one piloting information item representative of the available thrust margin of the anti-torque member 2.

According to a first variant of the monitoring method 30 shown in FIG. 5, this information step 34 can be implemented by an on-board instrument 9 which makes it possible to generate the piloting information representative exclusively of the available thrust margin of the anti-torque member 2.

As shown in FIG. 5, the calculation step 31 and the storage step 32 can for example be implemented in parallel, one independently of the other but prior to the comparison 33 and information 34 steps.

According to a second variant of the monitoring method 40 shown in FIG. 6, the information step 44 can also be implemented by an on-board instrument 19 generating piloting information from data representative of the available thrust margin of the anti-torque member 2 and at least one other margin.

Furthermore, this other margin is advantageously chosen from the group comprising a temperature margin of the gases at an inlet of a free low-pressure turbine of an engine of the power plant 4, a rotational speed margin of a gas generator of the engine of the power plant 4 and a margin of a torque exerted on an output shaft of the engine of the power plant 4.

In this case and as shown in FIG. 6, the storage step 42 can for example be implemented in series prior to the calculation step 41, this calculation step 41 itself being implemented in series prior to the comparison 43 and information 44 steps.

Furthermore, such a storage step 42 for example makes it possible to store at least three predetermined threshold values distinct from the operating parameter, the at least three predetermined threshold values respectively being related to at least three speeds of the power plant 4, the at least three speeds comprising a take-off speed of the rotorcraft 3, a maximum continuous speed and a transient speed.

Of course, the present invention is subject to many variations in its implementation. Although several embodiments have been described, it will be understood that it is not conceivable to exhaustively identify all of the possible modes. It is of course conceivable to replace a described means by an equivalent means without departing from the scope of the present invention.

The invention claimed is:

1. A device for monitoring an available thrust margin of an anti-torque member of a rotorcraft as a function of flight conditions, the rotorcraft including a power plant driving at least one main rotor participating at least in the lift of the rotorcraft, the anti-torque member participating in the control of the yaw movements of the rotorcraft, wherein the device comprises:

a logic controller configured to calculate a current value of an operating parameter representative of the thrust margin of the anti-torque member, the operating parameter being a function of a ratio between an available power of the power plant and at least one physicochemical parameter representative of a density of the surrounding outside air, a computer configured to compare the current value of the operating parameter with a predetermined threshold value of the operating parameter and to determine the available thrust margin of the anti-torque member, and at least one instrument on-board the rotorcraft making it possible to inform a pilot of the rotorcraft by displaying piloting information representative of at least the available thrust margin of the anti-torque member for the pilot to view while the rotorcraft is in flight.

2. The device according to claim 1, wherein the at least one on-board instrument is configured to display the piloting information representative only of the available thrust margin of the anti-torque member.

3. The device according to claim 1, wherein the at least one onboard instrument is configured to display the piloting information representative on the one hand of the available thrust margin of the anti-torque member and on the other hand of at least one other margin chosen from the group including a gas temperature margin at an inlet of a free low-pressure turbine of an engine of the power plant, a rotational speed margin of a gas generator of the engine of the power plant, and a margin of a torque exerted on an output shaft of the engine of the power plant.

4. The device according to claim 3, wherein the piloting information is first limit information representative of a minimum value chosen from the available thrust margin of the anti-torque member, the temperature margin of the gases at the inlet of the low-pressure free turbine, the margin for the rotational speed of the gas generator, and the margin for the torque exerted on the output shaft.

5. The device according to claim 1, wherein a memory stores at least three predetermined threshold values distinct from the operating parameter, the at least three predetermined threshold values respectively being related to at least three speeds of the power plant, the at least three speeds including a take-off speed of the rotorcraft, a maximum continuous speed, and a transient speed.

6. A rotorcraft comprising:

a power plant driving at least one main rotor participating at least in the lift of the rotorcraft;

an anti-torque member participating in the control of the yaw movements of the rotorcraft;

a monitoring device for monitoring an available thrust margin of the anti-torque member as a function of flight conditions, the monitoring device including a logic controller configured to calculate a current value of an operating parameter representative of the thrust margin of the anti-torque member, the operating parameter being a function of a ratio between an available power of the power plant and at least one physicochemical parameter representative of a density of the surrounding outside air, and the monitoring device further including a computer configured to compare the current value of the operating parameter with a predetermined threshold value of the operating parameter and to determine the available thrust margin of the anti-torque member.

7. The rotorcraft according to claim 6, wherein the monitoring device further includes at least one on-board instrument making it possible to inform a pilot of the rotorcraft by generating piloting information representative of at least the available thrust margin of the anti-torque member.

8. The rotorcraft according to claim 7,
wherein the at least one on-board instrument is configured to generate the piloting information representative only of the available thrust margin of the anti-torque member.

9. The rotorcraft according to claim 7,
wherein the at least one onboard instrument is configured to generate the piloting information representative on the one hand of the available thrust margin of the anti-torque member and on the other hand of at least one other margin chosen from the group including a gas temperature margin at an inlet of a free low-pressure turbine of an engine of the power plant, a rotational speed margin of a gas generator of the engine of the power plant, and a margin of a torque exerted on an output shaft of the engine of the power plant.

10. The rotorcraft according to claim 9,
wherein the piloting information is first limit information representative of a minimum value chosen from the available thrust margin of the anti-torque member, the temperature margin of the gases at the inlet of the low-pressure free turbine, the margin for the rotational speed of the gas generator, and the margin for the torque exerted on the output shaft.

11. The rotorcraft according to claim 6,
wherein the monitoring device further includes a memory configured to store at least three predetermined threshold values distinct from the operating parameter, the at least three predetermined threshold values respectively being related to at least three speeds of the power plant, the at least three speeds including a take-off speed of the rotorcraft, a maximum continuous speed, and a transient speed.

12. A method for monitoring an available thrust margin of an anti-torque member of a rotorcraft as a function of flight conditions, the rotorcraft including a power plant driving at least one main rotor participating at least in the lift of the rotorcraft, the anti-torque member participating in the control of the yaw movements of the rotorcraft,
wherein the method comprises the following steps:
calculating a current value of an operating parameter representative of the thrust margin of the anti-torque member, the operating parameter being a function of a ratio between an available power of the power plant and at least one physicochemical parameter representative of a density of the surrounding outside air,
comparing the current value of the operating parameter with a predetermined threshold value of the operating parameter, the comparison step making it possible to determine the available thrust margin of the anti-torque member, and
displaying, on at least one instrument on-board the rotorcraft, piloting information representative of at least the available thrust margin of the anti-torque member for the pilot to view while the rotorcraft is in flight.

13. The method according to claim 12, wherein the piloting information is representative only of the available thrust margin of the anti-torque member.

14. The method according to claim 12, wherein the piloting information is representative on the one hand of the available thrust margin of the anti-torque member and on the other hand of at least one other margin chosen from the group including a gas temperature margin at an inlet of a free low-pressure turbine of an engine of power plant, a rotational speed margin of a gas generator of engine of power plant, and a margin of a torque exerted on an output shaft of engine of power plant.

15. The method according to claim 14,
wherein the piloting information is first limit information representative of a minimum value chosen from the available thrust margin of the anti-torque member, a temperature margin of the gases at the inlet of the low-pressure free turbine, a margin for the rotational speed of the gas generator, and a margin for the torque exerted on the output shaft.

16. The method according to claim 14 further comprising:
storing in a memory at least three predetermined threshold values distinct from the operating parameter, the at least three predetermined threshold values respectively being related to at least three speeds of the power plant, the at least three speeds including a take-off speed of the rotorcraft, a maximum continuous speed, and a transient speed.

* * * * *